(12) United States Patent
Murciego Rodriguez et al.

(10) Patent No.: US 11,351,727 B2
(45) Date of Patent: Jun. 7, 2022

(54) THREE-DIMENSION PRINTING SYSTEM AND METHOD

(71) Applicant: HEWLETT-PACKARD DEVELOPMENT COMPANY, L.P., Spring, TX (US)

(72) Inventors: Pablo Antonio Murciego Rodriguez, Sant Cugat del Valles (ES); Esteve Comas Cespedes, Sant Cugat del Valles (ES); Sergi Rosell Bochaca, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/608,473

(22) PCT Filed: Jan. 19, 2018

(86) PCT No.: PCT/US2018/014382
§ 371 (c)(1),
(2) Date: Oct. 25, 2019

(87) PCT Pub. No.: WO2019/143346
PCT Pub. Date: Jul. 25, 2019

(65) Prior Publication Data
US 2020/0338817 A1 Oct. 29, 2020

(51) Int. Cl.
*B29C 64/165* (2017.01)
*B29C 64/227* (2017.01)
*B29C 64/188* (2017.01)
*B29C 64/245* (2017.01)
*B29C 64/295* (2017.01)
*B29C 64/393* (2017.01)
(Continued)

(52) U.S. Cl.
CPC .......... *B29C 64/165* (2017.08); *B29C 64/188* (2017.08); *B29C 64/205* (2017.08); *B29C 64/241* (2017.08); *B29C 64/245* (2017.08); *B29C 64/295* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/171; B29C 64/176; B29C 64/182; B29C 64/241
See application file for complete search history.

(56) References Cited

U.S. PATENT DOCUMENTS 6,821,039 B2 * 11/2004 Lewis .......... B41J 3/54
400/649
9,610,735 B2 4/2017 Yoo et al.
(Continued)

FOREIGN PATENT DOCUMENTS

WO WO2015108546 A2 7/2015
WO WO2016068899 A1 5/2016
WO WO2016080993 A1 5/2016

*Primary Examiner* — Atul P. Khare
(74) *Attorney, Agent, or Firm* — HP Inc. Patent Deparment

(57) ABSTRACT

According to one example, there is provided a method of controlling a three-dimensional printing system, comprising obtaining data relating to a three-dimensional object to be generated, controlling a set of process modules to move around a path in a single direction over a build chamber to selectively perform a respective process action on the build platform to generate a three-dimensional object therein.

20 Claims, 10 Drawing Sheets

(51) Int. Cl.
*B29C 64/241* (2017.01)
*B29C 64/205* (2017.01)
*B33Y 70/00* (2020.01)
*B33Y 10/00* (2015.01)
*B33Y 30/00* (2015.01)
*B33Y 50/02* (2015.01)

(56) References Cited

U.S. PATENT DOCUMENTS

| | | | |
|---|---|---|---|
| 9,914,169 B2* | 3/2018 | Ederer | B22F 3/105 |
| 10,220,564 B2* | 3/2019 | Nauka | B29C 35/0805 |
| 10,252,544 B2* | 4/2019 | Cassoni | B41J 3/4073 |
| 10,632,732 B2* | 4/2020 | El-Siblani | B33Y 10/00 |
| 10,710,159 B2* | 7/2020 | Corsmeier | B29C 64/153 |
| 10,800,153 B2* | 10/2020 | Emamjomeh | B29C 64/386 |
| 10,821,511 B2* | 11/2020 | Shaw | B22F 10/20 |
| 2013/0026680 A1 | 1/2013 | Ederer et al. | |
| 2014/0065194 A1 | 3/2014 | Yoo et al. | |
| 2015/0017271 A1* | 1/2015 | Donaldson | B41J 2/125 |
| | | | 425/171 |
| 2015/0183166 A1* | 7/2015 | Yoo | B29C 64/245 |
| | | | 264/128 |
| 2016/0136966 A1 | 5/2016 | Cassoni et al. | |
| 2016/0311171 A1 | 10/2016 | Bradway et al. | |
| 2016/0368050 A1 | 12/2016 | Morris et al. | |
| 2018/0141275 A1* | 5/2018 | Patel | B30B 11/08 |
| 2019/0344500 A1* | 11/2019 | Cote | B29C 64/241 |

* cited by examiner

THREE-DIMENSION PRINTING SYSTEM AND METHOD

BACKGROUND

Powder-based three-dimensional (3D) printing systems typically form successive layers of a powder, or powder-like, build material on a build platform and selectively solidify portions of each formed layer to generate a 3D object on a layer-by-layer basis. Typically, the modules used to perform the different processing actions are mounted on a carriage, and the modules are controlled to selectively perform their respective processing actions as they are moved in a reciprocating manner over a build platform.

BRIEF DESCRIPTION

Examples will now be described, by way of non-limiting example only, with reference to the accompanying drawings, in which.

DETAILED DESCRIPTION

Figure 1A:
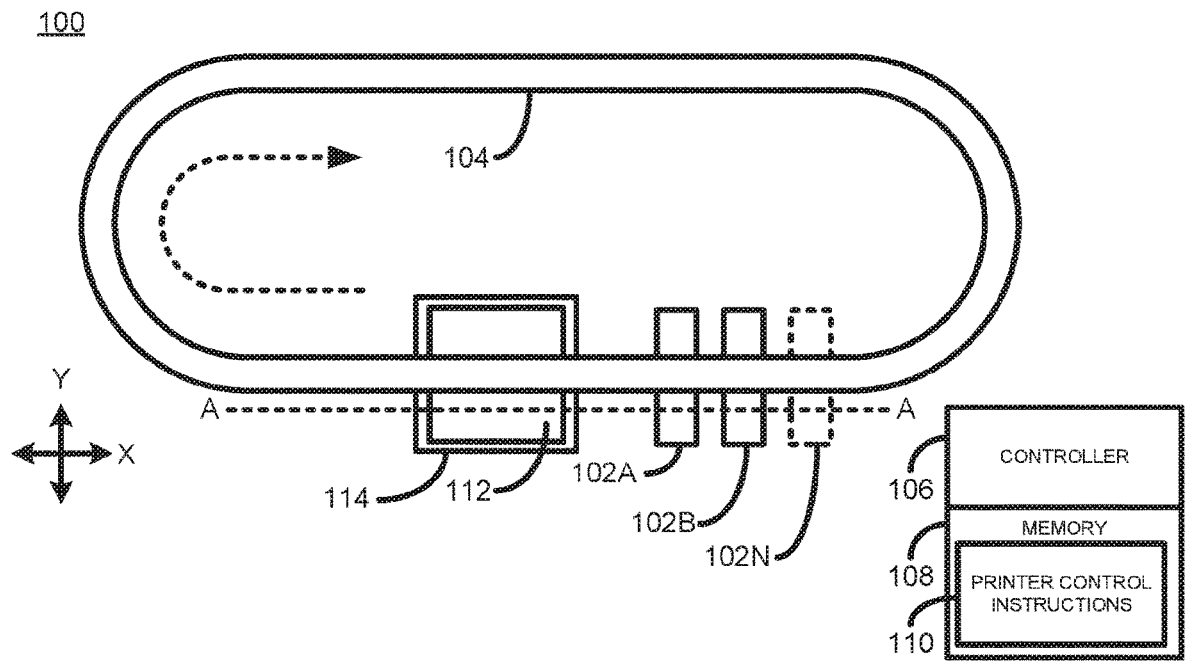
FIGS. 1A and 1B are respectively top and side view schematic diagrams illustrating a 3D printing system according to an example.
Figure 1B:
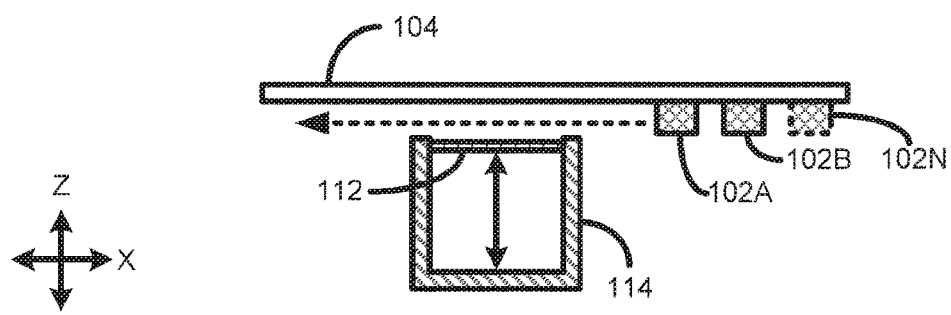

Referring now to FIG. 1 there is shown a schematic diagram of a 3D printing system 100 according one example. FIG. 1A shows a top view of the 3D printing system 100, and FIG. 1B shows a corresponding side view taken through the plane A:A and showing a portion of the 3D printing system 100.

The 3D printing system 100 comprises a set of process modules 102A to 102N. Although there are multiple process modules 102 shown in FIG. 1, there may, in different examples, be one, two, or more of such modules. Where there are two or more process modules in the set of process modules in one example each of the process modules 102 may perform a different function. In another example, where there are two or more process modules in the set of process modules there may be multiple process modules that perform the same function.

The process modules are moveable around a continuous path or circuit 104. In one example the path 104 is configured in a horizontal plane. The path 104 may comprise, for example, a physical path, such as a rail, or set of rails, or any other suitable guide system. In one example, each of the process modules are individually and independently drivable around the path 104, for example by individual drive motors (not shown). In one example, two or more of the process modules may be coupled together so that the process modules are drivable around the path 104 together. As each of the process modules 102 are moved around the path 104 they may be controlled, for example by 3D printer controller 106 to selectively perform one or multiple actions on a build platform 112 of a build chamber 114. It will be understood that performing an action on the build platform 112 may comprise performing an action on a layer of build material formed thereon. The actions performed may, for example, be based on data derived from or relating to a digital model of a 3D object to be generated by the 3D printing system 100, or based on other control data.

In some examples, a process module may be controlled to pass over the build chamber 114 and not perform a process action thereon.

The print controller 106 comprises a processor, such as a microprocessor, coupled to a memory 108 in which are stored printer control instructions 110. Execution of the printer control instructions 110 by the controller 106 cause the printer 100 to operate as described herein.

In one example, the process modules 102 are coupled to the path 104 in such a way that the process modules 102 may only be moved around the path in a sequential order. For example, such a coupling may not allow one process module to overtake another process module.

In another example, the process modules 102 may be coupled to the path 104 in a way that allows one process module 102 to overtake another process module 102. In one example, the path 104 may comprise an additional siding portion (not shown) and path diverter system, for example similar to a railroad passing siding, to allow one process module to be diverted along the siding portion whilst another process module overtakes the diverted process module parked module.

The actions performed by the process modules cause the generation of one or multiple 3D objects in the build chamber 114 on a layer-by-layer basis. In some examples a process module may perform an action such as measurement actions, on the build chamber 114, such as temperature measurements, optical measurements, etc, that may be used by the 3D printing system 100 in the generation of 3D objects. Thus, the generation of a 3D object formed from multiple layers of build material may be generated as a result of the process modules be moved around the path 104 multiple times and performing actions on the build chamber 114 multiple times, for examples as defined in the printer control instructions 110.

In the examples described herein all of the process modules 102 are controlled by the controller 106 to move around the path 104 in a single and unique direction, at least whilst the 3D printer 100 is being operated to generate 3D objects, and are controllable to selectively perform one or multiple process actions to generate 3D objects in the build chamber 114.

In one example each process module 102 may perform a separate process action, although in other examples a process module may be configured to perform multiple process actions. Depending on the kind of 3D printing techniques implemented, a process module may be provided to perform one or more of the following process actions:

a. forming a layer of build material on a build platform or on a previously formed layer of build material;
b. applying pre-heating energy to warm build material to a temperature below its melting point;
c. selectively applying an energy absorbing fusing agent on a formed layer of build material;
d. applying fusing energy substantially uniformly to a layer of build material to cause portions of the build material on which fusing agent was applied to heat up above the melting point of the build material to cause such portions to fuse and subsequently solidify;
e. selective applying a detailing agent to control fusing, or a temperature, of portions of a layer of build material;
f. determining a temperature of one or multiple portions of a layer of build material;
g. determining a characteristic, such as one or more of: a height characteristic; a thickness characteristic; and an optical property characteristic, of one or multiple portions of a layer of build material;
h. selectively applying a chemical binder agent to chemically bind portions of a layer of build material;
i. applying drying and/or curing energy to dry and/or cure a chemical binder agent;
j. selectively applying focused energy, such as laser energy, to cause one or more of localized melting, sintering, and fusion of portions of a layer of build material;
k. applying a masked energy pattern to cause one or more of: localized melting, sintering, fusion, drying, and curing of portions of a layer of build material.

In other examples additional process actions may be performed.

As described further below, such a unidirectional configuration may be present numerous benefits over 3D printing systems in which process modules are moved bi-directionally, in a reciprocating manner, over a build platform. Such benefits may be particularly helpful in 3D printing systems that thermally fuse or sinter build material to generate a 3D object, as explained further below.

In the example shown, the process modules 102 are mounted below the path 104, however, in other examples the process modules may be mounted in other configurations, such as, for example, above, or to the side, of the path 104. In the example shown in FIG. 1A the process modules are mounted centrally below the path 104, although in other examples at least one of the process modules may be mounted in a non-central configuration.

The build chamber 114 in which 3D objects are formed may, in one example, be part of a removable build unit, and in another example, may be an integrated part of the 3D printer 100. In one example the build chamber 114 is positioned a predetermined distance below the path 104. This distance is set to allow each of the process modules 102 to suitably perform their process actions of the build platform 112. The base of different ones of the process module 102 may be at different heights, depending on the particular characteristics thereof and/or the function to be performed thereby.

As shown in FIG. 1B, the build chamber 114 comprises a build platform 112 which is moveable vertically (in the z-axis). Although not shown, the build platform 112 may be coupled to a piston or screw type mechanism to enable it to raised and lowered with a high degree of accuracy. Layers of a suitable build material, such as a powdered, or powder-like, plastic, metal, ceramic, or the like build material, may be formed on the build platform 112 and portions of each formed layer of build material may be selectively solidified to form a layer of a 3D object. Example suitable build materials may also include short-fibre build materials formed from short fibres that may, for example, have been cut into short lengths from long strands or threads of material.

The generation of 3D objects using powder-based 3D printing techniques generally involves at least two separate processes. The first process is to form a thin layer of build material on a build platform, or on a previously formed layer of build material. In one example, each layer of formed build material may be between about 80 to 120 microns thick, although in other examples thicker or thinner layers of build material may be formed.

The second process is to selectively solidify portions of each formed layer of build material to form a layer of the 3D object to be generated. These processes are repeated until each of the layers of a 3D object have been generated.

After each layer of build material has been selectively solidified, the build platform 112 may be lowered by a predetermined amount to allow a further layer of build material to be formed thereon. This may be achieved, for example, by lowering the build platform 112 by an appropriate height.

Forming Layers of Build Material

In one example, as illustrated in FIG. 1B, a layer of build material may be formed on the build platform 112 by moving a build material distributor process module, such as process module 102A, over the build platform 112. The build material distributor process module may contain, or may be supplied with, build material that may be deposited over the build platform 112. In one example the build material distributor process module may deposit a dose of build material along one edge of the build platform 112 or build chamber 114, and this dose may then be spread over the build platform 112 by a roller or wiper, to form a layer of build material of a predetermined thickness on the build platform, or on a previously formed layer of build material. In one example the roller or wiper may be part of the build material distributor process module, although in another example the roller or wiper may be part of a separate process module.

In another example, the build material distributor process module may comprise a build material distribution mechanism that may deposit one or multiple doses of build material along the length of build platform 112. The one or multiple doses may be spread by a roller or wiper mechanism as described above.

Figure 2:
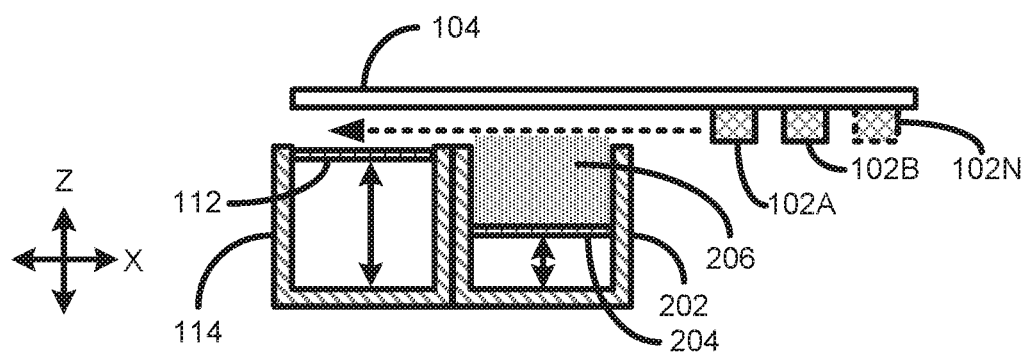
FIG. 2 is a schematic side view of a portion of a 3D printing system according to an example.

FIG. 2 illustrates a further example of a system to form a layer of build material to be formed on the build platform 112. In this example, a build material supply unit 202 is provided adjacent to the build chamber 114. The build material supply unit 202 defines a build material storage chamber the base of which is formed from a vertically moveable supply platform 204. Initially, the platform 204 may be positioned at its lowest position, and the storage chamber may be filled with a suitable build material 206. The supply platform 204 may then be raised to elevate a small quantity of build material above the height of the supply unit 202, to provide a dose of build material that may be spread over the build platform 112 using, for example, a roller or wiper mechanism as described above.

Although not shown in FIG. 1B nor in FIG. 2, a build material recovery chamber may be provided to receive any excess build material spread over the build platform 112.

In another example (not shown) the build material spreading mechanism may be part of the build chamber 114 and hence may not be performed by one of the process modules 102.

Layer by Layer Object Generation

The way in which portions of a layer of build material may be selectively solidified to form a layer of an object being generate may vary depending on the type of 3D printing techniques used by a given 3D printing system. Below a number of non-limiting examples are described with reference to FIGS. 3 to 18.

Figure 3:
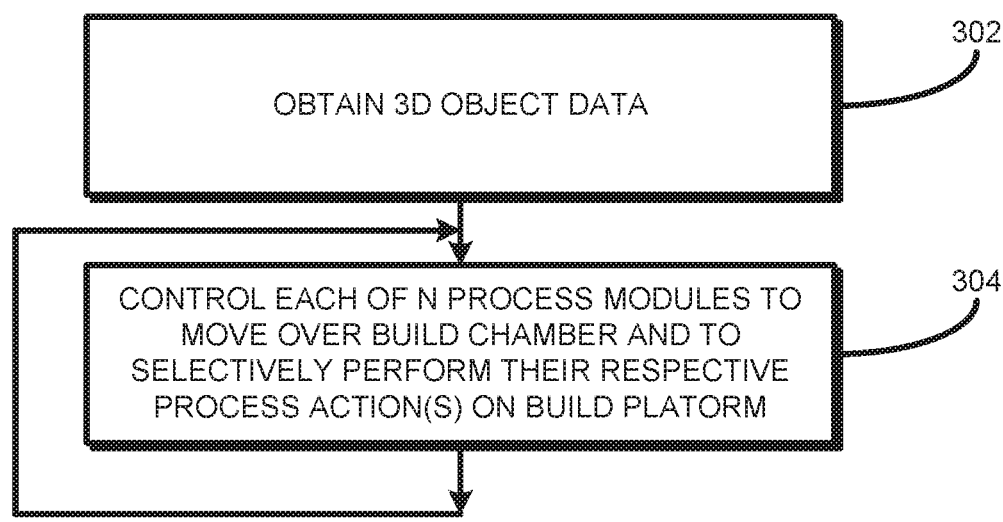
FIG. 3 is a flow diagram illustrating a method of operating a 3D printing system according to an example.

Referring now to FIG. 3 there is shown a method 300 of operating a 3D printing system such as the system 100 illustrated in FIG. 1. For example, such a system may have N process modules each for performing a respective process action (or process actions). For example, the system 100 may comprise a first process module 102A for performing a first process action, and a second process module 102B for performing a second process action. The method 300 may, for example, be defined by printer control instructions 110 stored in the memory 108 of the controller 106.

At block 302 the controller 106 obtains data defining a 3D object to be generated by the 3D printing system 100. In one example the data is derived from a digital 3D model of the object to be generated.

At block 304 the controller 106 controls each of the N process modules to move over the build unit 114 and to selectively perform their respective process action(s) on the build platform to cause the object defined by the 3D object data to be generated. For example, the 3D object data may define, for each layer of the 3D object, portions of each layer of build material that are to be solidified. A first process module may be controlled to form, in a first pass in a first direction over the build platform 112, a layer of build material on the build platform 112. A second process module may be controlled, in a first pass in the first direction over the build platform 112, to selectively solidify a portion of the formed layer of build material in accordance with the 3D object data. These processes may be repeated, with each pass being performed in the same first direction, until the 3D object has been generated within the build chamber 114.

In one example, the controller 106 may control a process module to move over the build chamber 114 at a first speed, and may control a process module to move around the remainder of the path 104 at a second speed. The second speed may be, for example, a speed higher than the first speed. In one example, the second speed is a variable speed. For example, a process module may be accelerated to a higher speed once it has performed a processing action on the build chamber, and then may slowed to the first speed as a subsequent process action is performed. In this way, a process module may be moved around the path 104 at a variable speed based on its position along the path 104 relative to the build chamber 114.

Once the 3D object has been generated any non-solidified build material may be extracted allowing the generated 3D object to be removed. In one example the extraction of non-solidified build material may be performed within the 3D printing system 100, and in another example the build chamber 114 may be removed from the printing system 100 and be processed by an external build material processing station (not shown).

Figure 4A:
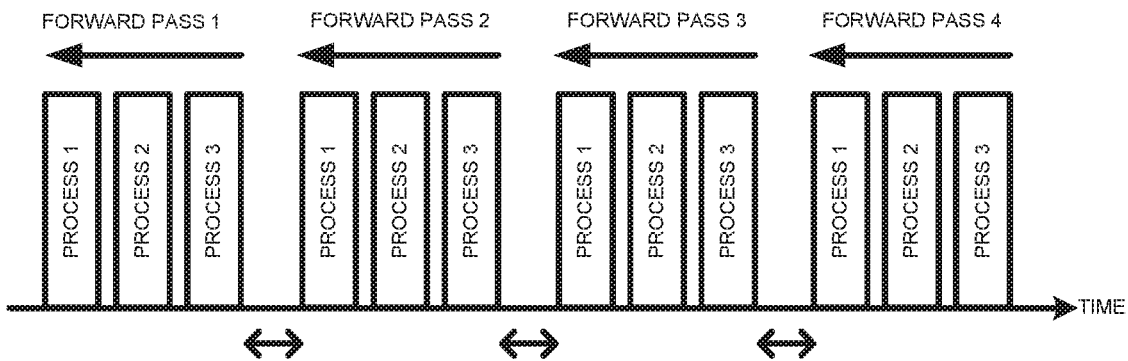
FIGS. 4A to 4C shows the timing of three repeated process actions as measured from a given point within a build chamber according to an example.
Figure 4B:
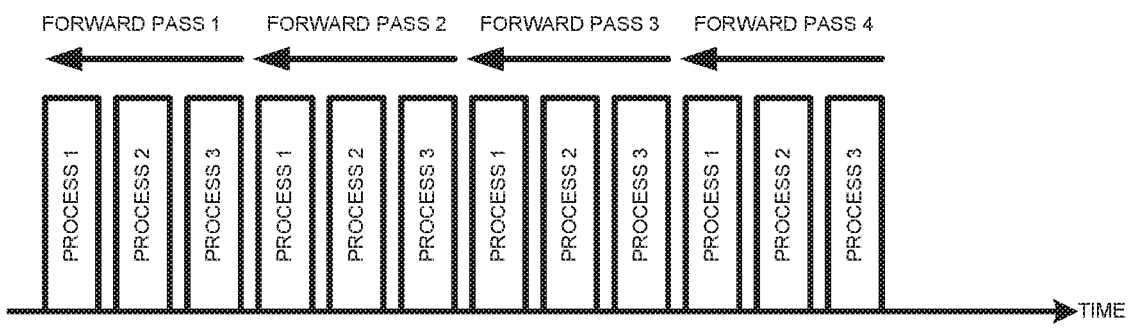

As previously mentioned, one benefit of such a system is that each of the different process actions may be performed with a regular cadence, as illustrated in FIGS. 4A and 4B.

FIG. 4A shows the timing of three repeated process actions as measured from a given point within the build chamber 114 according to one example. As can be seen, for a given pass of a set of process modules, process 1 is performed, followed shortly after by process 2, followed shortly after by process 3. This may be achieved, for example, by the process modules being moved around the path 104 in close succession in a first direction. Depending on the length of the path 104, or on the speed at which each of the process modules are moved around the path 104, there may be a delay between each of the forward passes. However, the time delay between the same process action being performed on any portion of a layer of build material on successive passes is the same, or is with acceptable limits.

FIG. 4B shows the timing of three repeated process actions as measured from a given point within the build chamber 114 according to one example. As can be seen, for each pass of the set of process modules, process 1 is performed, followed shortly after by process 2, followed shortly after by process 3. Furthermore, the delay between successive passes of the set of process modules is controlled to be the same as the delay between successive process actions within a single pass. The delays between process actions being performed can be controlled, for example, by controlling the speed of the process modules around the path 104.

Figure 4C:
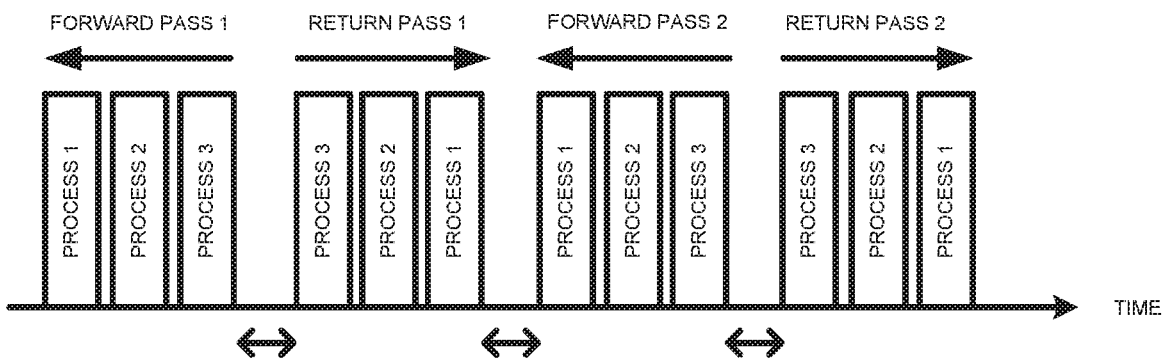

For comparison with a bidirectional scanning system, FIG. 4C shows the timing of three repeated process actions in a bidirectional scanning 3D printing system. As can be seen, a first set of process actions are performed in a first forward pass with a constant delay between each process action. A small delay is then incurred as the process modules move in a first return pass. Note that due to the bi-direction scanning system, on the return pass the process actions may be performed in a different order to the forward pass. As can be clearly seen in FIG. 4C, one effect of this is that time delay between successive same process actions being performed is not constant. For example, there is a relatively long delay between the first two occurrences of process action 1 being performed, whereas there is a relatively short delay between the second and third occurrence of process action 1 being performed. For some 3D printing processes, such as those that use thermal fusion, this can lead to difficulties in thermal management, due, for example, to the application of pre-heating and/or fusing energy being applied with a non-regular timing.

A number of specific, but non-limiting, examples will now be described with reference to FIGS. 5 to 12.

Figure 5:
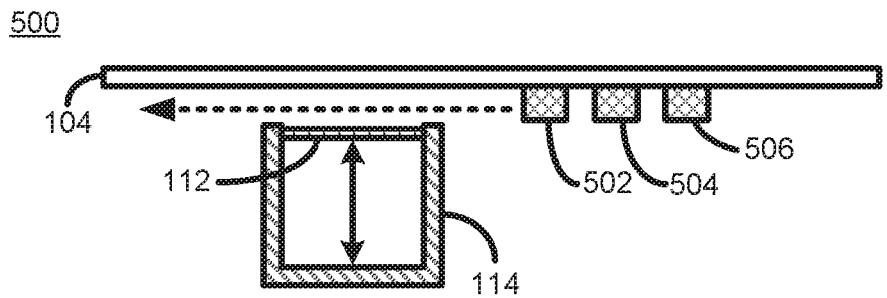
FIG. 5 is a schematic side view of a portion of a 3D printing system according to an example.

FIG. 5 illustrates a 3D printing system 500 having three process modules 502, 504, and 506 according to one example. A first process module 502 is to form a layer of build material on the build platform 112, or on a previously formed layer of build material. As previously mentioned, the first process module 502 may include a roller or wiper to spread a volume of build material over the build platform 112 as the first process module is moved over the build unit 114 in a first direction.

A second process module 504 is to selectively apply an energy absorbing fusing agent to portions of each formed layer of build material. The fusing agent may, for example, be applied based on data derived from a 3D object model of an object to be generated. In one example the process module 504 comprises an inkjet type printhead. In one example the process module 504 comprise a printhead that spans the width of the build platform 112, thereby enabling application of fusing agent to be performed in a single pass as the printhead is moved over the build platform.

A third process module 506 is to apply fusing energy to each formed layer of build material to cause portions of a layer of build material on which fusing agent has been applied to heat up above the melting point of the build material and to thermally fuse and coalesce before solidifying upon cooling. In one example, the process module 506 comprises an energy source, such as a halogen lamp, an array of halogen lamps, an array of light emitting diodes (LEDs), an array of laser diodes, an array of vertical-cavity surface-emitting lasers (VSEL), or any other suitable type of energy source. In one example the process module 506 comprise an energy source, such as a lamp or an array of lamps, that span the width of the build platform 112, thereby enabling application of fusing energy in a single pass as the energy source is moved over the build platform.

Figure 6:
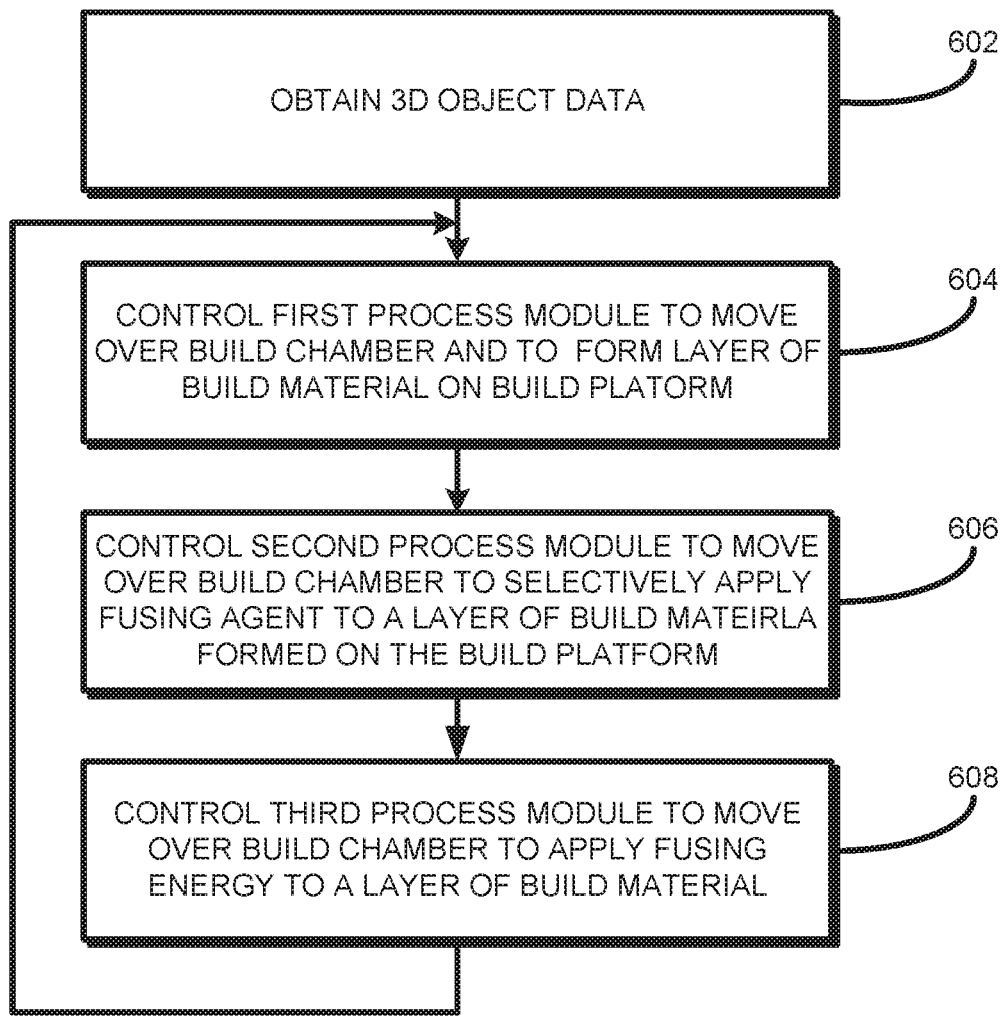
FIG. 6 is a flow diagram illustrating a method of operating a 3D printing system according to an example.

The operation of 3D printing system 500 may be controlled by a controller such as the controller 106 described above having printer control instructions 110 to cause the 3D printing system 500 to operate in accordance with the flow diagram of FIG. 6.

At block 602, the controller 106 obtains 3D object data.

At block 604, the controller 106 controls the first process module 502 to move over the build chamber 114 to form a layer of build material on the build platform 112 or on a previously formed layer of build material.

At block 606, the controller 106 controls the second process module 504 to move over the build chamber 114 to selectively print, or otherwise apply, an energy absorbing fusing agent on the formed layer of build material. The selective application of fusing agent may be performed, for example, based on the obtained 3D object data.

At block 608, the controller 106 controls the third process module 506 to move over the build chamber 114 to apply fusing energy to the formed layer of build material. In this way, portions of the formed layer of build material on which fusing agent are present absorb more energy than portions of the layer of build material on which no fusing agent is present, and are heated above the melting temperature of the build material. Such portions thus melt, coalesce, fuse, and solidify (upon cooling) to form a layer of the 3D object being generated.

The controller 106 controls the process modules 502, 504, and 506 to repeat the above described operations until the 3D object being generated has been completely formed.

In one example the controller 106 controls the movement of the process modules around the path 104 such that the timing of at least some of the same process actions are performed with a constant delay, for example as illustrated in FIGS. 4A and 4B.

Figure 7:
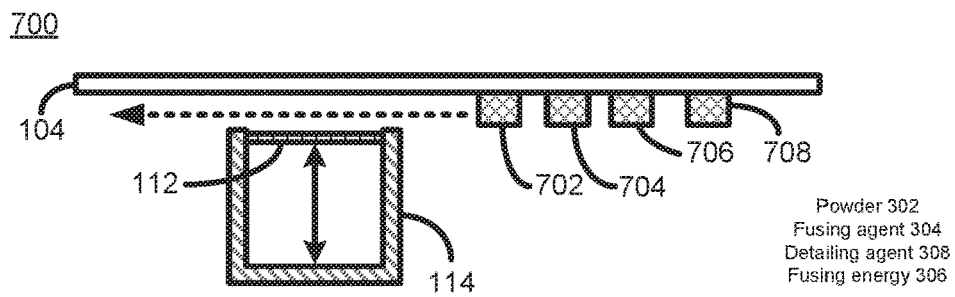
FIG. 7 is a schematic side view of a portion of a 3D printing system according to an example.

FIG. 7 illustrates a 3D printing system 700 having four process modules 702, 704, 706, and 708 according to one example. A first process module 702 is to form a layer of build material on the build platform 112, or on a previously formed layer of build material. As previously mentioned, the first process module 702 may include a roller or wiper to spread a volume of build material over the build platform 112 as the first process module is moved over the build unit 114 in a first direction.

A second process module 704 is to selectively apply an energy absorbing fusing agent to portions of each formed layer of build material. The fusing agent may, for example, be applied based on data derived from a 3D object model of an object to be generated. In one example the process module 704 comprises an inkjet type printhead. In one example the process module 704 comprise a printhead that spans the width of the build platform 112, thereby enabling application of fusing agent to be performed in a single pass as the printhead is moved over the build platform.

A third process module 706 is to selectively apply an energy controlling or detailing agent to portions of each formed layer of build material. The detailing agent may, for example, be applied based on one or more of: data derived from a 3D object model of an object to be generated; a thermal model or simulation; and thermal feedback from a thermal camera or sensor (for example, provided on a process module). In one example the process module 706 comprises an inkjet type printhead. In one example the process module 706 comprise a printhead that spans the width of the build platform 112, thereby enabling application of fusing agent to be performed in a single pass as the printhead is moved over the build platform.

In one example the third process module 706 is coupled to the second process module 704.

A fourth process module 708 is to apply fusing energy to each formed layer of build material to cause portions of a layer of build material on which fusing agent has been applied to heat up above the melting point of the build material and to thermally fuse and coalesce before solidifying upon cooling. Portions of a layer of build material on which detailing agent has been applied may, in one case, not heat up above the melting point of the build material, for example where it is applied in isolation. In another case, for example where detailing agent is applied on or in proximity to regions on which fusing agent is applied, the detailing agent serves to control the temperature of a portion of build material to a desired level. In one example, the process module 506 comprises an energy source, such as a halogen lamp, an array of halogen lamps, an array of light emitting diodes (LEDs), or any other suitable type of energy source. In one example the process module 504 comprise an energy source, such as a lamp or an array of lamps, that span the width of the build platform 112, thereby enabling application of fusing energy in a single pass as the energy source is moved over the build platform.

Figure 8:
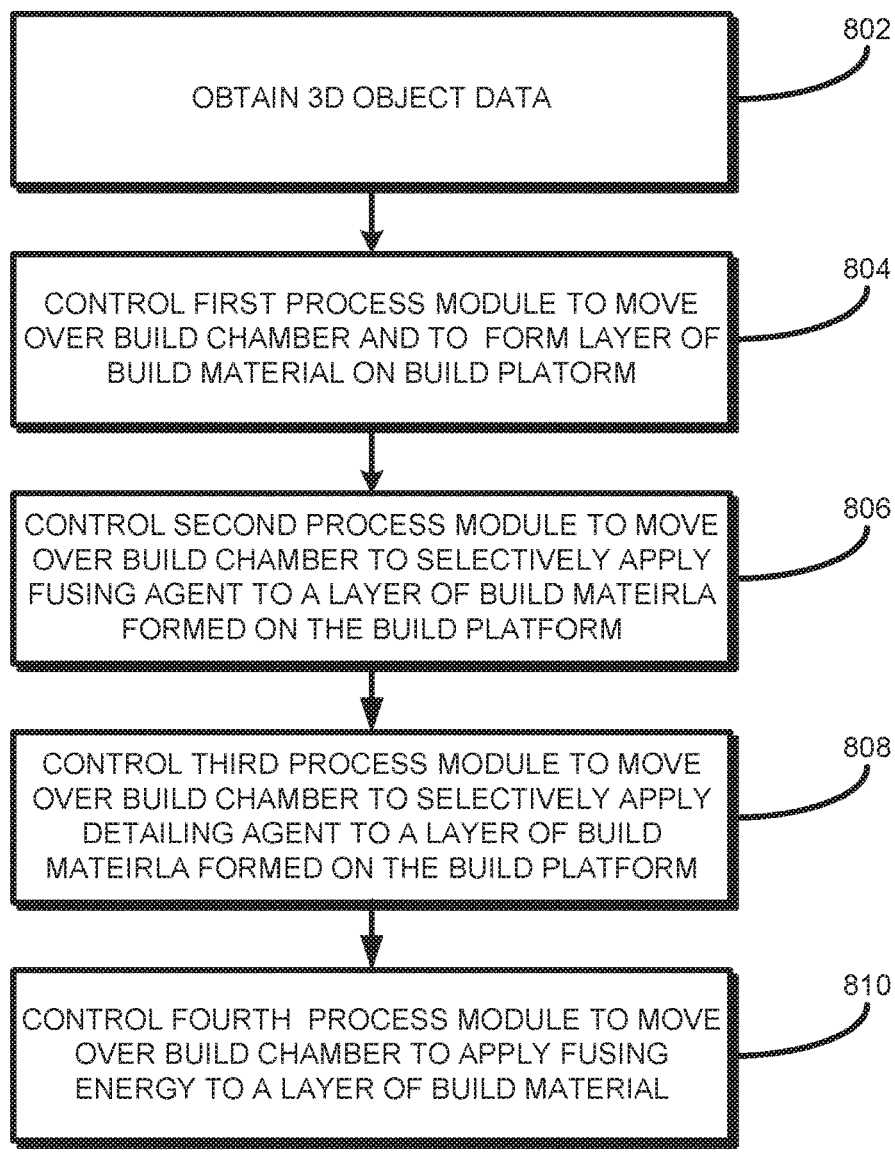
FIG. 8 is a flow diagram illustrating a method of operating a 3D printing system according to an example.

The operation of 3D printing system 700 may be controlled by a controller, such as the controller 106, described above having printer control instructions 110 to cause the 3D printing system 700 to operate in accordance with the flow diagram of FIG. 8.

At block 802, the controller 106 obtains 3D object data.

At block 804, the controller 106 controls the first process module 702 to move over the build chamber 114 to form a layer of build material on the build platform 112 or on a previously formed layer of build material.

At block 806, the controller 106 controls the second process module 704 to move over the build chamber 114 to selectively print, or otherwise apply, an energy absorbing fusing agent on the formed layer of build material. The selective application of fusing agent may be performed, for example, based on the obtained 3D object data.

At block 808, the controller 106 controls the third process module 706 to move over the build chamber 114 to selectively print, or otherwise apply, a detailing agent on the formed layer of build material.

At block 810, the controller 106 controls the fourth process module 708 to move over the build chamber 114 to apply fusing energy to the formed layer of build material. In this way, portions of the formed layer of build material on which fusing agent are present absorb more energy than portions of the layer of build material on which no fusing agent is present, and are heated above the melting temperature of the build material. Such portions thus melt, coalesce, fuse, and solidify (upon cooling) to form a layer of the 3D object being generated.

The controller 106 controls the process modules 702, 704, 706, and 708 to repeat the above described operations until the 3D object being generated has been completely formed.

In one example the controller 106 controls the movement of the process modules around the path 104 such that the timing of at least some of the same process actions are performed with a constant delay, for example as illustrated in FIGS. 4A and 4B.

Figure 9:
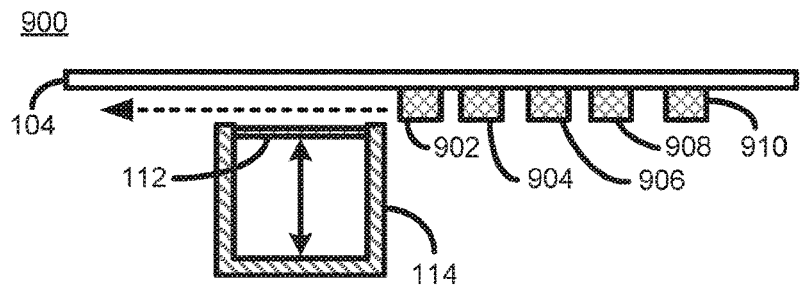
FIG. 9 is a schematic side view of a portion of a 3D printing system according to an example.

FIG. 9 illustrates a 3D printing system 900 having five process modules 902, 904, 906, 908, and 910 according to one example. A first process module 902 is to form a layer of build material on the build platform 112, or on a previously formed layer of build material. As previously mentioned, the first process module 902 may include a roller or wiper to spread a volume of build material over the build platform 112 as the first process module is moved over the build unit 114 in a first direction.

A second process module 904 is to apply pre-heating or warming energy to heat the formed layer of build material to temperature close to, but below, the melting temperature of the build material used. In one example the process module 504 comprise an energy source, such as a lamp or an array of lamps, that span the width of the build platform 112, thereby enabling application of pre-heating energy in a single pass as the energy source is moved over the build platform.

A third process module 906 is to selectively apply an energy absorbing fusing agent to portions of each formed layer of build material. The fusing agent may, for example, be applied based on data derived from a 3D object model of an object to be generated. In one example the process module 906 comprises an inkjet type printhead. In one example the process module 906 comprise a printhead that spans the width of the build platform 112, thereby enabling application of fusing agent to be performed in a single pass as the printhead is moved over the build platform.

A fourth process module 908 is to selectively apply an energy controlling or detailing agent to portions of each formed layer of build material. The detailing agent may, for example, be applied based on one or more of: data derived from a 3D object model of an object to be generated; a thermal model or simulation; and thermal feedback from a thermal camera or sensor. In one example the process module 908 comprises an inkjet type printhead. In one example the process module 908 comprise a printhead that spans the width of the build platform 112, thereby enabling application of fusing agent to be performed in a single pass as the printhead is moved over the build platform.

In one example the fourth process module 908 is coupled to the second process module 704. In another example the functionality of the fourth process module 906 is provided by the third process module 904.

A fifth process module 910 is to apply fusing energy to each formed layer of build material to cause portions of a layer of build material on which fusing agent has been applied to heat up above the melting point of the build material and to thermally fuse and coalesce before solidifying upon cooling. Portions of a layer of build material on which detailing agent has been applied may, in one case, not heat up above the melting point of the build material, for example where it is applied in isolation. In another case, for example where detailing agent is applied on or in proximity to regions on which fusing agent is applied, the detailing agent serves to control the temperature of a portion of build material. In one example, the process module 910 comprises an energy source, such as a halogen lamp, an array of halogen lamps, an array of light emitting diodes (LEDs), or any other suitable type of energy source.

Figure 10:
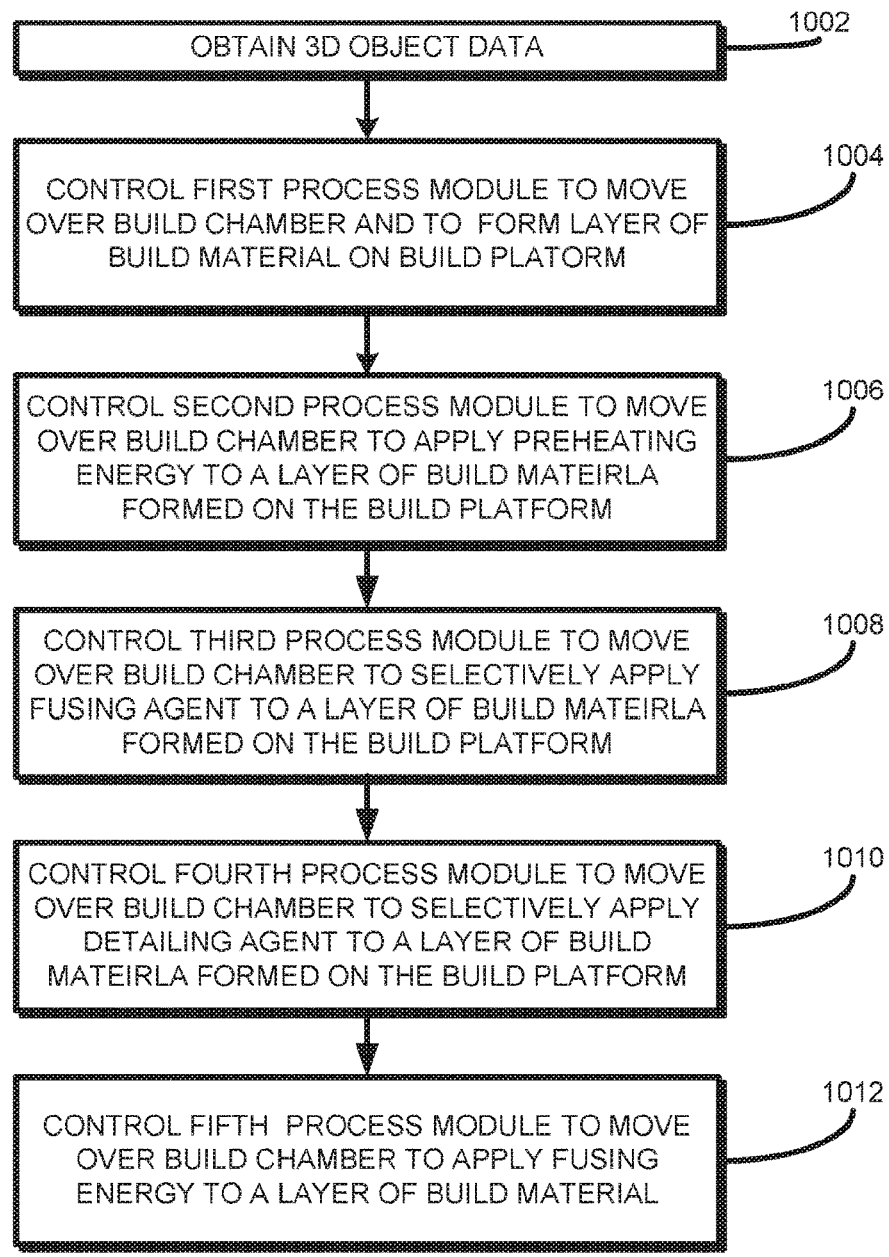
FIG. 10 is a flow diagram illustrating a method of operating a 3D printing system according to an example.

The operation of 3D printing system 900 may be controlled by a controller such as the controller 106 described above having printer control instructions 110 to cause the 3D printing system 900 to operate in accordance with the flow diagram of FIG. 10.

At block 1002, the controller 106 obtains 3D object data.

At block 1004, the controller 106 controls the first process module 902 to move over the build chamber 114 to form a layer of build material on the build platform 112 or on a previously formed layer of build material.

At block 1006, the controller 106 controls the second process module 904 to move over the build chamber 114 to apply pre-heating or warming energy to heat the formed layer of build material to temperature close to, but below, the melting temperature of the build material used.

At block 1008, the controller 106 controls the third process module 906 to move over the build chamber 114 to selectively print, or otherwise apply, an energy absorbing fusing agent on the formed layer of build material. The selective application of fusing agent may be performed, for example, based on the obtained 3D object data.

At block 1010, the controller 106 controls the fourth process module 908 to move over the build chamber 114 to selectively print, or otherwise apply, a detailing agent on the formed layer of build material.

At block 1012, the controller 106 controls the fifth process module 910 to move over the build chamber 114 to apply fusing energy to the formed layer of build material. In this way, portions of the formed layer of build material on which fusing agent are present absorb more energy than portions of the layer of build material on which no fusing agent is present, and are heated above the melting temperature of the build material. Such portions thus melt, coalesce, fuse, and solidify (upon cooling) to form a layer of the 3D object being generated.

The controller 106 controls the process modules 902, 904, 906, 908, and 910 to repeat the above described operations until the 3D object being generated has been completely formed.

In one example the controller 106 controls the movement of the process modules around the path 104 such that the timing of at least some of the same process actions are performed with a constant delay, for example as illustrated in FIGS. 4A and 4B.

In one example, a build material pre-heating system, such as a fixed pre-heating energy source (not shown) may be provided to preheat each formed layer of build material to a temperature close to, but below, the melting temperature of the build material used.

In one example, a thermal camera, or other temperature sensing module, may be provided to determine a temperature of portions of an upper layer of build material on the build platform 112. In one example, the thermal camera may be located on a process module, and hence be moveable around the path 104. The thermal camera may thus determine the temperature of an upper layer of build material on the build platform 112 as the thermal camera is moved over the build platform 112.

In another example, the thermal camera may be located at a fixed position that enables the temperature of an upper layer of build material on the build platform 112 to be measured.

In one example, a process module may be controlled to be stopped over the build chamber whilst a process action is performed thereon. For example, a temperature sensing process module comprising a thermal camera may be controlled to be stopped over the middle of the build platform 112 whilst the camera obtains thermal data therefrom.

Figure 11:
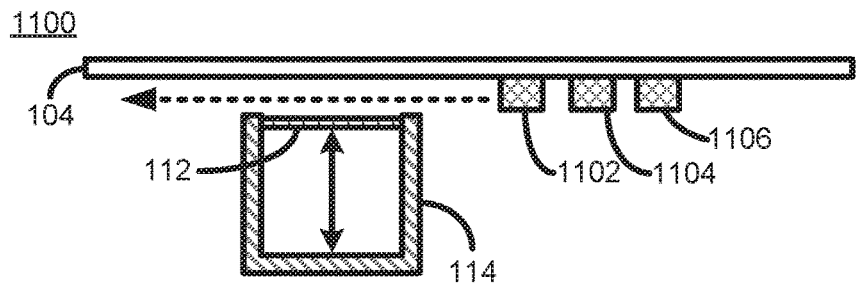
FIG. 11 is a schematic side view of a portion of a 3D printing system according to an example.

FIG. 11 illustrates a 3D printing system 110 having three process modules 1102, 1104, and 1108, according to one example. A first process module 1102 is to form a layer of build material on the build platform 112, or on a previously formed layer of build material. As previously mentioned, the first process module 1102 may include a roller or wiper to spread a volume of build material over the build platform 112 as the first process module is moved over the build unit 114 in a first direction.

A second process module 1104 is to selectively apply a binding agent, such as a chemical binder agent, to portions of each formed layer of build material. The binding agent may, for example, be applied based on data derived from a 3D object model of an object to be generated. In one example the process module 1104 comprises an inkjet type printhead. In one example the process module 1104 comprise a printhead that spans the width of the build platform 112, thereby enabling application of binder agent to be performed in a single pass as the printhead is moved over the build platform.

A third process module 1106 is to apply drying and/or curing energy to each formed layer of build material to cause portions of a layer of build material on which binder agent has been applied to bind together build material on which the binder agent has been applied.

The system 1100 may be used, for example, with a powdered metal or ceramic build material and the application of binder agent and drying/curing energy may be used to generate a so-called 'green part' of bound build material. The generated green part may subsequently be sintered in a suitable furnace or oven (not shown) to cause a fully dense, or highly dense, fused object to be generated.

Figure 12:
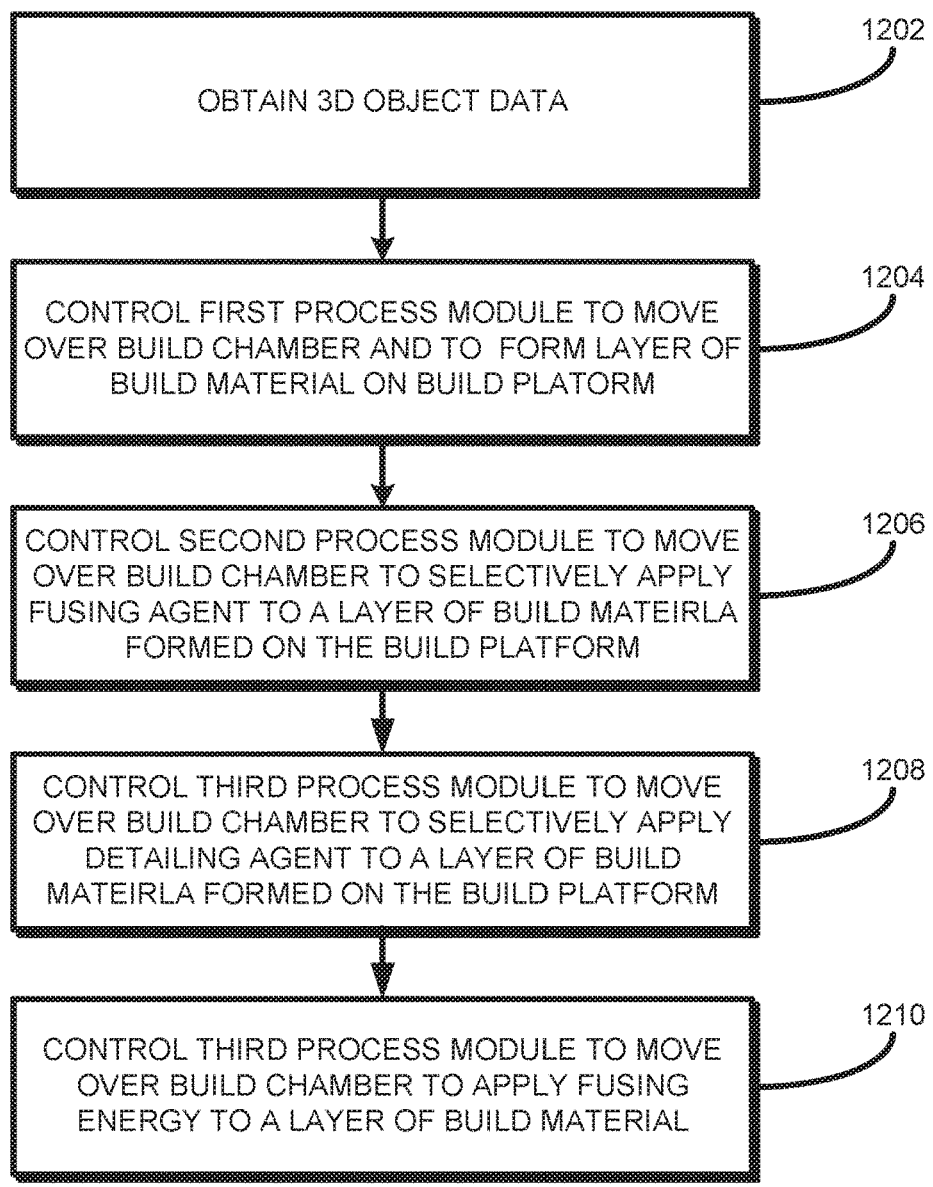
FIG. 12 is a flow diagram illustrating a method of operating a 3D printing system according to an example.

The operation of 3D printing system 1100 may be controlled by a controller such as the controller 106 described above having printer control instructions 110 to cause the 3D printing system 1100 to operate in accordance with the flow diagram of FIG. 12.

At block 1202, the controller 106 obtains 3D object data.

At block 1204, the controller 106 controls the first process module 1102 to move over the build chamber 114 to form a layer of build material on the build platform 112 or on a previously formed layer of build material.

At block 1206, the controller 106 controls the second process module 1104 to move over the build chamber 114 to selectively print, or otherwise apply, a binder agent on the formed layer of build material. The selective application of binder agent may be performed, for example, based on the obtained 3D object data.

At block 1208, the controller 106 controls the third process module 1106 to move over the build chamber 114 to apply drying and/or curing energy to the formed layer of build material. In this way, portions of the formed layer of build material on which binder agent are present are bound together by the dried or cured binder agent.

The controller 106 controls the process modules 1102, 1104, and 1106, to repeat the above described operations until the 3D object being generated has been completely formed.

In one example the controller 106 controls the movement of the process modules around the path 104 such that the timing of at least some of the same process actions are performed with a constant delay, for example as illustrated in FIGS. 4A and 4B.

In other examples, 3D printing systems having other configurations of process modules can be formed, depending on the 3D printing techniques used and depending on specific requirements.

Figure 13:
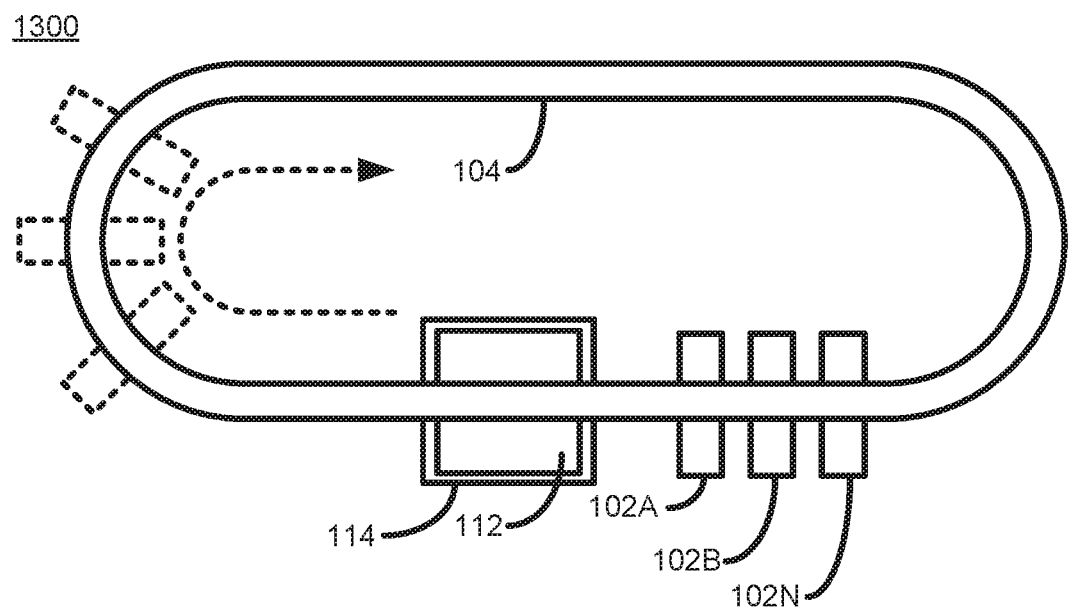
FIG. 13 is a schematic top view of a 3D printing system according to one example.

Moving on to FIG. 13, there is shown a top view of a 3D printing system 1300 according to one example. In this example, the orientation of the process modules 102 is fixed with respect to the path 104, as illustrated by the three process modules shown in dotted line. Hence, as the process modules complete each lap of the path 104 they effective undergo a 360 degree rotation.

Figure 14:
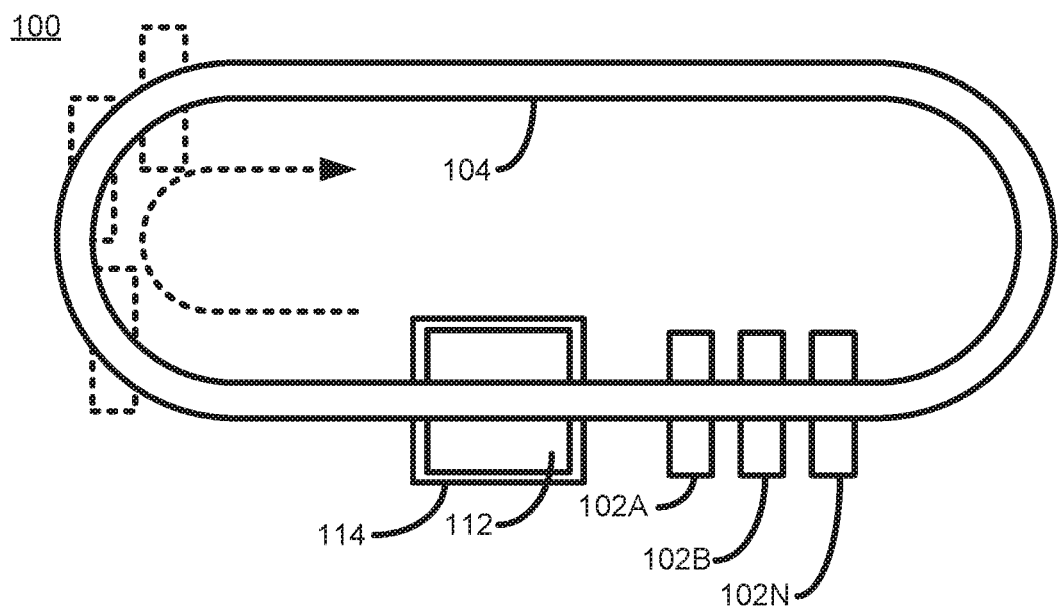
FIG. 14 is a schematic top view of a 3D printing system according to one example.

In a further example, illustrated in FIG. 14, the orientation of the process modules 102 is not fixed with respect to the path 104. For example, the process modules 102 may each be mounted on rotatable mountings that are controlled, or are configured, to rotate to maintain each process module in an orientation perpendicular to the two straight parallel portions of the path 104, as illustrated by the three process modules shown in dotted line. One benefit of such a configuration is that the process modules do not undergo a 360 degree rotation during each complete lap of the path 104 which may simplify cabling, ducting, and tubing, for example, to different ones of the process modules 102.

Figure 15:
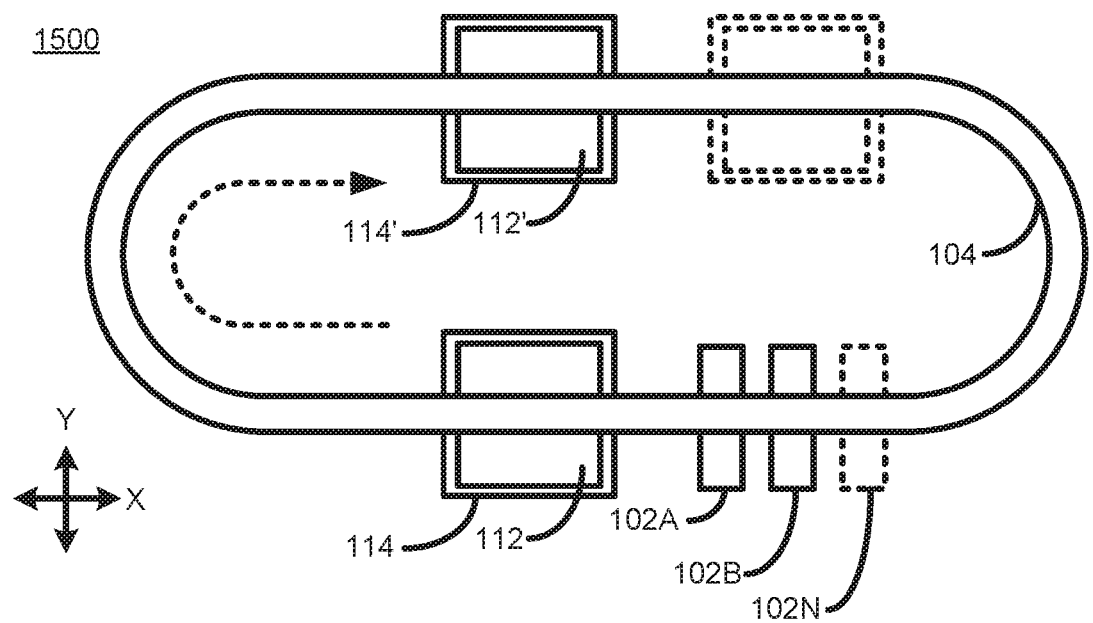
FIG. 15 is a schematic top view of a 3D printing system according to one example.

A yet further example of a 3D printing system is illustrated in FIG. 15 in which multiple build chambers 114 and 114' are positioned at different positions around the path 104. Each of the build chambers 114 may, for example, be of different lengths and may be removable once a 3D printing operation in a build chamber has been completed. In this way, the 3D printing system 1500 may perform 3D printing operations in multiple chambers during each lap of the process modules 102 around the path 104. The build operation to be performed in each of the build chambers 114 may be different from each other and may be based on 3D object model data that defines one or multiple 3D objects that are to be generated in each of the build chambers 114.

Furthermore, a build chamber may be installed into the 3D printing system 1500 at any time, for example whilst 3D build operations are being performed on in other build chamber present in the 3D printing system 1500. In this way, such a 3D printing system may provide a highly productive 3D printing system capable of operation without stopping during the installing and uninstalling of build chambers therein. A 3D printer controller can control the particular process operations to be performed based on 3D object model data related to each of build chambers present.

Figure 16:
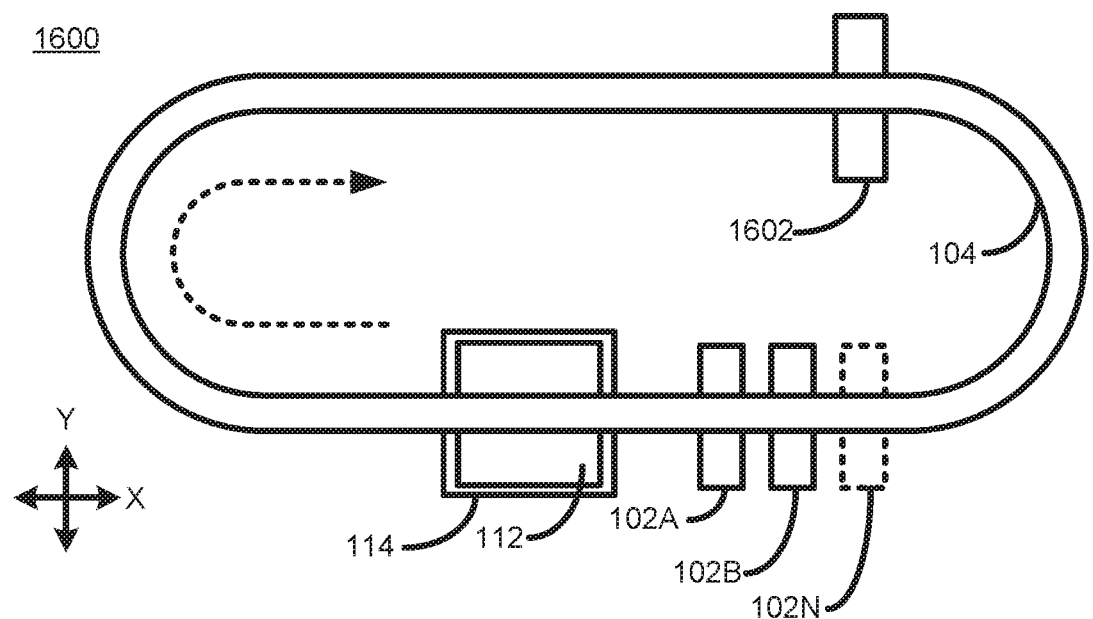
FIG. 16 is a schematic top view of a 3D printing system according to one example.

In a still further example, illustrated in FIG. 16, a 3D printing system 1600 is shown in which a process module service station 1602 is provided. The process module service station 1602 may be provided to perform a service operation on one or more of the process modules 102. In one example, multiple service stations 1602 may be provided, each to provide dedicated service operations to a process module 102. In one example, the service station 1602 may, for example, provide one or more of: printhead cleaning operations; recoater/roller cleaning operations; printhead cooling operations; and energy source cleaning operations. A decision of whether a process module 102 should be processed by the service station 1602 may be taken by the 3D printer controller. In one example, if a process module is to be serviced by the service station 1602, the controller may control the speed of at least one of the process modules around at least a portion of the path 104 such that performance of the service operation does not affect, or does not unduly affect, the timing of process operations performed by the process module in a build chamber. For example, a process module may be moved at a faster speed around a portion of the path 104 to allow time for the service operation to be performed thereon. In one example, a service operation may be performed on a process module whilst the process module is moving over the service station 1602. In another example, a service operation may be performed on a process module whilst the process module is stationary above the service station 1602.

Figure 17:
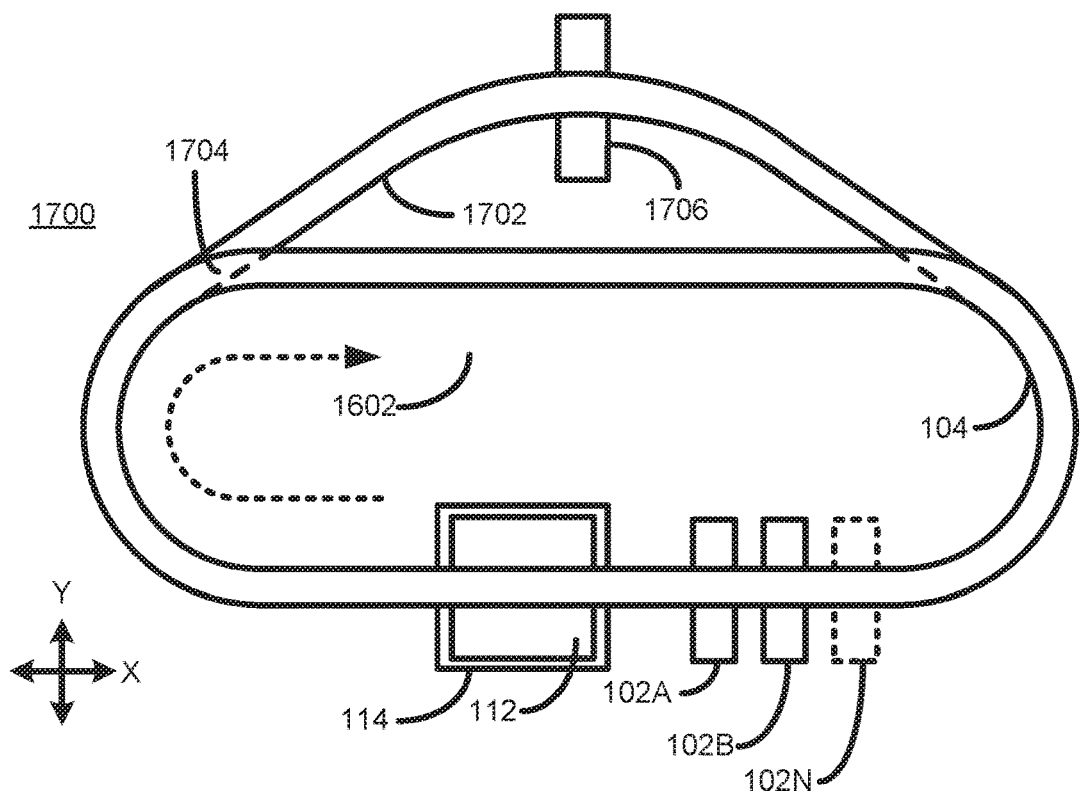
FIG. 17 is a schematic top view of a 3D printing system according to one example.

In a further example, illustrated in FIG. 17, a 3D printing system 1700 is shown in which the path 104 comprises an additional siding portion 1702 through which any process module 102 may be diverted. For example, the path 104 may comprise a controllable diverter module 1704 to allow a 3D printer controller to selectively divert a process module onto the siding portion 1702. In the example shown, a service station 1706 is provided to allow a service operation to be performed on a process module. In one example, a service operation may be performed on a process module whilst the process module is moving over the service station 1602. In another example, a service operation may be performed on a process module whilst the process module is stationary above the service station 1602. In another example, an additional duplicate process modules may be positioned in the siding portion 1702, for example, to allow one process module to parked, whilst another process module is movable around the main path 104. For example, if two duplicate printhead process modules are provided, one such module may be parked in the siding portion 1702, for example, to allow it to cool or to allow it to have a maintenance operation performed thereon, whilst the other printhead process module is moved around the main path 104.

Figure 18:
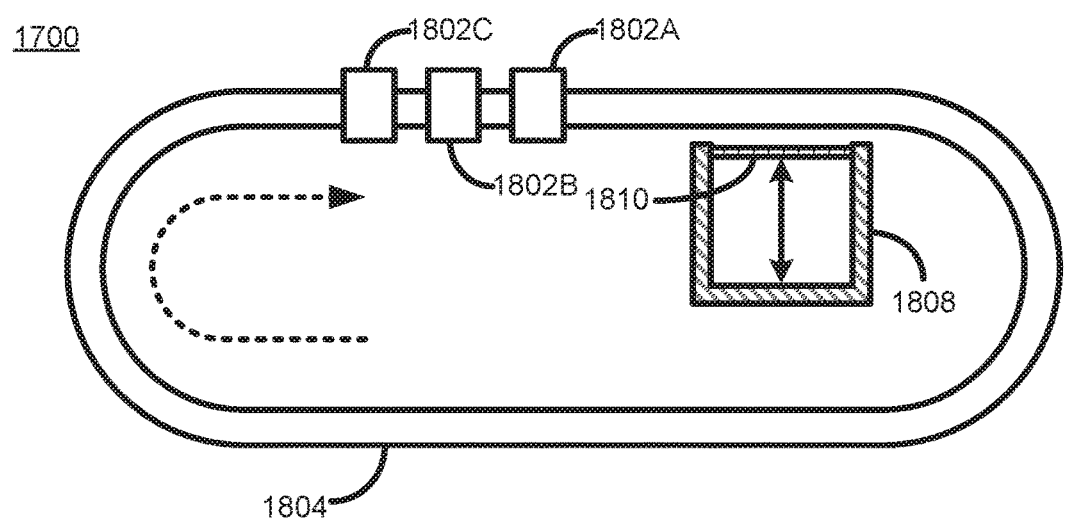
FIG. 18 is a schematic side view of a 3D printing system according to one example.

In a further example, illustrated in FIG. 18, there is shown a side view of 3D printing system 1800 wherein a path 1804 is provided in a vertical configuration. In this example a set of process modules 1802 are moved around the path 1804 to perform 3D printing process operations on a build chamber 1808 having a build platform 1810. In this example, an upper portion of the path 1804, at a first height, may be used to perform build operations on a build chamber 1808, and a lower portion of the path 1804, at a second lower height, may be used to perform build operations in a second build chamber (not shown), or may be used to perform service operations at a service station (not shown).

According to one example, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc.

According to one example, a suitable build material may be PA12 build material commercially known as V1R10A "HP PA12" available from HP Inc.

It should be understood, however, that the examples described herein may not limited to powder-based build materials. In other examples the build material may be a paste or a gel.

It will be appreciated that examples described herein can be realized in the form of hardware, software or a combination of hardware and software. Any such software may be stored in the form of volatile or non-volatile storage such as, for example, a storage device like a ROM, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method and a machine readable storage storing such a program. Still further, some examples may be conveyed electronically via any medium such as a communication signal carried over a wired or wireless connection.

All of the features disclosed in this specification (including any accompanying claims, abstract and drawings), and/or any of the methods or processes so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A three-dimensional printing system comprising:
   a build platform;
   a set of process modules each configured to perform a different action on the build platform or on a layer of build material formed on the build platform;
   a continuous path comprising a closed-loop rail configured in a horizontal plane and on which each of the process modules is movably mounted to pass over the build platform; and
   a controller programmed to:
      control each of the process modules to move in the same direction around the continuous path to pass over the build platform; and
      control each of the process modules to selectively perform a process action on the build platform.

2. The system of claim 1, wherein the controller is programmed to control each of the process modules to move in the same direction and in a sequential order around the closed loop of the continuous path.

3. The system of claim 1, wherein each of the process modules is individually and independently drivable around the continuous path.

4. The system of claim 1, wherein two or more of the process modules are linked together and are controllable to be collectively driven around the continuous path.

5. The system of claim 1, wherein the process modules are individually selectable from one or more of:
   a build material distributor configured to form a layer of build material on the build platform;

a print agent distributor configured to selectively print a printing agent on a formed layer of build material;

a heating energy source configured to pre-heat a formed layer of build material to a temperature close to but below the melting temperature of the build material;

a fusing energy source configured to cause a portion of build material on which a fusing agent has been printed to melt;

a curing energy source configured to cause a binding agent printed on a layer of build material to cure; and a thermal imaging camera configured to determine a temperature profile of a formed layer of build material.

6. The system of claim 1, wherein the controller is programmed to control at least one of the process modules to move over the build platform such that the time between each performed action thereby, as measured from a point on the build platform, is substantially the same between successive passes of at least one of the process modules over the build platform.

7. The system of claim 1, wherein the speed at which each of the process modules is controlled to move around the continuous path is one of:
   a continuous speed; and
   a variable speed.

8. The system of claim 1, where the controller is programmed to control a first of the process modules to:
   perform an action on the build platform as the first process module is moving over the build platform.

9. The system of claim 1, wherein the controller is further programmed to control the build platform to lower by a predetermined amount once a set of process actions have been performed thereon by one or more of the process modules.

10. The system of claim 1, wherein the continuous path comprises a siding portion and a path diverter system, and wherein the controller is programmed to control the path diverter system to divert a selected one or more of the process modules onto the siding portion.

11. The system of claim 1, wherein one or more of the process modules are mounted on a rotatable mounting to maintain an orientation of the one or more process modules with respect to the build platform as the one or more process modules are moved around the path.

12. The system of claim 1, wherein the rail is one of a set of rails.

13. The system of claim 1, wherein the set of process modules comprises:
   a first of the process modules configured to spread a layer of build material; and
   a second of the process modules configured to selectively solidify the layer of build material.

14. The system of claim 1, further comprising a supply unit adjacent to the build platform, the supply unit comprising a supply platform configured to elevate to provide a quantity of build material above the supply unit that is spread onto the build platform by a first process module of the set of process modules.

15. The system of claim 1, wherein the rail comprises a siding and diverter to allow a change in an order of the process modules on the rail.

16. The system of claim 1, wherein the set of process modules comprises:
   a first of the process modules configured to spread a layer of build material;
   a second, separate one of the process modules configured to selectively apply a fusing agent to the layer of build material; and
   a third, separate one of the process modules configured to apply energy to fuse portions of the layer of build material treated with the fusing agent,
   wherein each of the three modules is independently moveable along the continuous path.

17. A method of controlling a three-dimensional printing system according to claim 1, the method comprising:
   obtaining data relating to a three-dimensional object to be generated; and
   controlling the set of process modules to move in the same direction around the continuous path to selectively perform a respective process action on the build platform to generate a three-dimensional object thereon, wherein each of the process modules performs a different action as part of generating the three-dimensional object.

18. The method of claim 17, further comprising:
   controlling a first of the process modules to form a layer of build material on the build platform; and
   controlling a second of the process modules to selectively solidify a portion of the formed layer of build material based on the obtained data.

19. The method of claim 17, further comprising:
   controlling a first of the process modules to form a layer of build material on the build platform;
   controlling a second of the process modules to print a fusing agent on a portion of the formed layer of build material; and
   controlling a third of the process modules to apply a fusing energy to the formed layer of build material to cause build material on which the fusing agent is printed to heat up and melt.

20. The method of claim 19, further comprising:
   controlling a fourth of the process modules to apply a detailing agent on a portion of the formed layer of build material to control fusing and/or a temperature of a portion of the formed layer of build material.

* * * * *